US008888908B2

(12) United States Patent
Murphy et al.

(10) Patent No.: US 8,888,908 B2
(45) Date of Patent: Nov. 18, 2014

(54) COLORANT COMPOSITIONS COMPRISING METATHESIZED UNSATURATED POLYOL ESTERS

(75) Inventors: Timothy A. Murphy, Yorkville, IL (US); Brent A. Aufdembrink, Plymouth, MN (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 180 days.

(21) Appl. No.: 12/281,931

(22) PCT Filed: Mar. 7, 2007

(86) PCT No.: PCT/US2007/005868
§ 371 (c)(1),
(2), (4) Date: Jan. 15, 2009

(87) PCT Pub. No.: WO2007/103460
PCT Pub. Date: Sep. 13, 2007

(65) Prior Publication Data
US 2009/0126602 A1    May 21, 2009

Related U.S. Application Data

(60) Provisional application No. 60/780,127, filed on Mar. 7, 2006.

(51) Int. Cl.
| | |
|---|---|
| C08L 91/02 | (2006.01) |
| F42B 8/14 | (2006.01) |
| F42B 10/00 | (2006.01) |
| C09B 67/02 | (2006.01) |
| C09B 67/20 | (2006.01) |
| F42B 6/10 | (2006.01) |
| C09B 67/26 | (2006.01) |
| C09B 67/46 | (2006.01) |

(52) U.S. Cl.
CPC ......... *C09B 67/0063* (2013.01); *C09B 67/0097* (2013.01); *F42B 6/10* (2013.01); *C09B 67/0073* (2013.01); *C09B 67/0084* (2013.01); *F42B 8/14* (2013.01)
USPC ........... 106/251; 102/502; 102/501; 102/513; 428/34.1; 428/402.2

(58) Field of Classification Search
USPC ........................... 106/251; 102/501, 502, 506
See application file for complete search history.

(56) References Cited

U.S. PATENT DOCUMENTS

| 2,619,422 A | 11/1952 | Whiting |
| 3,448,178 A | 6/1969 | Flanagan |

(Continued)

FOREIGN PATENT DOCUMENTS

| DE | 19956226 | 5/2001 |
| EP | 429995 A2 | 6/1991 |

(Continued)

OTHER PUBLICATIONS

Erhan, S.Z., Drying properties of metathesized soybean oil, 1997, Journal of the American Oil Chemists' Society 74:66, 703-706.*

(Continued)

*Primary Examiner* — James J Seidleck
*Assistant Examiner* — S. Camilla Pourbohloul
(74) *Attorney, Agent, or Firm* — Brinks Gilson & Lione

(57) ABSTRACT

Disclosed are improved colorant compositions that are suitable for encapsulation in an impact-rupturable casing that is adapted for intact projectile motion and rupture upon contact with a target surface. In many embodiments, the colorant compositions comprise (a) a carrier comprising: (i) a metathesized unsaturated polyol ester; and (ii) a polyol ester; and (b) a colorant. The colorant compositions are useful in paint balls for use in conjunction with projectile devices, such as paint ball markers.

24 Claims, 9 Drawing Sheets

(56) References Cited

U.S. PATENT DOCUMENTS

| | | | |
|---|---|---|---|
| 3,896,053 A | 7/1975 | Broecker et al. | |
| 4,634,606 A | 1/1987 | Skogg | |
| 5,043,485 A | 8/1991 | Fleckenstein et al. | |
| 5,142,072 A * | 8/1992 | Stipp et al. | 554/172 |
| 5,506,363 A | 4/1996 | Grate et al. | |
| 5,639,526 A | 6/1997 | Kotsiopoulos et al. | |
| 5,700,516 A | 12/1997 | Sandvick et al. | |
| 5,734,070 A | 3/1998 | Tacke et al. | |
| 5,958,851 A * | 9/1999 | Cannon et al. | 508/491 |
| 6,063,144 A | 5/2000 | Calzada et al. | |
| 6,169,198 B1 | 1/2001 | Fischer et al. | |
| 6,197,894 B1 | 3/2001 | Sunaga et al. | |
| 6,211,315 B1 | 4/2001 | Larock et al. | |
| 6,214,918 B1 | 4/2001 | Johnson et al. | |
| 6,223,658 B1 * | 5/2001 | Rosa et al. | 102/501 |
| 6,224,641 B1 | 5/2001 | Matzat et al. | |
| 6,255,375 B1 | 7/2001 | Michelman | |
| 6,262,153 B1 | 7/2001 | Webster et al. | |
| 6,281,163 B1 | 8/2001 | Van Dijk | |
| 6,284,007 B1 | 9/2001 | Tao | |
| 6,420,333 B1 * | 7/2002 | Hsu et al. | 510/441 |
| 6,503,285 B1 | 1/2003 | Murphy | |
| 6,530,962 B1 * | 3/2003 | Stolz | 8/576 |
| 6,586,506 B2 | 7/2003 | Webster et al. | |
| 6,599,334 B1 | 7/2003 | Anderson | |
| 6,645,261 B2 | 11/2003 | Murphy et al. | |
| 6,696,597 B2 | 2/2004 | Pederson et al. | |
| 6,716,155 B2 | 4/2004 | Sleeter | |
| 6,730,137 B2 | 5/2004 | Pesu et al. | |
| 6,770,104 B2 | 8/2004 | Murphy | |
| 6,773,469 B2 | 8/2004 | Murphy | |
| 6,797,020 B2 | 9/2004 | Murphy | |
| 6,824,572 B2 | 11/2004 | Murphy | |
| 6,846,573 B2 | 1/2005 | Seydel | |
| 6,900,347 B2 | 5/2005 | Paulson et al. | |
| 6,962,729 B2 | 11/2005 | Tokas et al. | |
| 6,987,154 B2 | 1/2006 | Choi et al. | |
| 7,026,495 B1 | 4/2006 | Pedersen et al. | |
| 7,119,216 B2 | 10/2006 | Newman et al. | |
| 7,128,766 B2 | 10/2006 | Murphy et al. | |
| 7,176,336 B2 | 2/2007 | Maughon et al. | |
| 7,192,457 B2 | 3/2007 | Murphy et al. | |
| 7,217,301 B2 | 5/2007 | Murphy et al. | |
| 7,314,904 B2 | 1/2008 | Nadolsky et al. | |
| 7,365,140 B2 | 4/2008 | Piers et al. | |
| 7,462,205 B2 | 12/2008 | Murphy | |
| 7,812,185 B2 | 10/2010 | Burdett et al. | |
| 2001/0051680 A1 | 12/2001 | Webster et al. | |
| 2002/0095007 A1 | 7/2002 | Larock et al. | |
| 2002/0157303 A1 | 10/2002 | Murphy et al. | |
| 2003/0017431 A1 | 1/2003 | Murphy | |
| 2003/0046860 A1 | 3/2003 | Tiffany et al. | |
| 2003/0057599 A1 | 3/2003 | Murphy et al. | |
| 2003/0061760 A1 | 4/2003 | Tao et al. | |
| 2003/0091949 A1 | 5/2003 | Pesu et al. | |
| 2003/0110683 A1 | 6/2003 | Murphy | |
| 2003/0198826 A1 | 10/2003 | Seydel | |
| 2003/0207971 A1 | 11/2003 | Stuart, Jr. et al. | |
| 2003/0236377 A1 | 12/2003 | Choi et al. | |
| 2004/0047886 A1 | 3/2004 | Murphy et al. | |
| 2004/0088907 A1 | 5/2004 | Murphy | |
| 2004/0088908 A1 | 5/2004 | Murphy | |
| 2004/0200136 A1 | 10/2004 | Tao et al. | |
| 2004/0221503 A1 | 11/2004 | Murphy et al. | |
| 2004/0221504 A1 | 11/2004 | Murphy | |
| 2005/0014664 A1 | 1/2005 | Nadolsky et al. | |
| 2005/0027136 A1 | 2/2005 | Toor et al. | |
| 2005/0060927 A1 | 3/2005 | Murphy | |
| 2005/0070750 A1 | 3/2005 | Newman et al. | |
| 2005/0080301 A1 | 4/2005 | Maughon et al. | |
| 2005/0123780 A1 | 6/2005 | Seydel | |
| 2005/0154221 A1 | 7/2005 | Lysenko et al. | |
| 2005/0158679 A1 | 7/2005 | Chen et al. | |
| 2005/0269728 A1 | 12/2005 | Roos | |
| 2006/0079704 A1 * | 4/2006 | Lacombe et al. | 554/124 |
| 2006/0128912 A1 | 6/2006 | Piers et al. | |
| 2006/0236593 A1 | 10/2006 | Cap | |
| 2006/0272199 A1 | 12/2006 | Licciardello et al. | |
| 2006/0272200 A1 | 12/2006 | Murphy et al. | |
| 2007/0006522 A1 | 1/2007 | Tao | |
| 2007/0039237 A1 | 2/2007 | Murphy et al. | |
| 2007/0144058 A1 | 6/2007 | Chen et al. | |
| 2007/0151480 A1 | 7/2007 | Bloom et al. | |
| 2007/0282000 A1 | 12/2007 | Murphy et al. | |
| 2009/0217568 A1 | 9/2009 | Murphy et al. | |

FOREIGN PATENT DOCUMENTS

| | | |
|---|---|---|
| EP | 1408064 A1 | 4/2004 |
| FR | 2878246 A1 | 5/2006 |
| JP | 56077243 | 6/1981 |
| JP | 09014574 | 1/1997 |
| SU | 1565872 | 5/1990 |
| WO | WO 94-23836 A1 | 10/1994 |
| WO | WO 96/04289 | 2/1996 |
| WO | WO 00/46565 | 8/2000 |
| WO | WO 01/36368 | 5/2001 |
| WO | WO 03/018905 | 3/2003 |
| WO | WO 03/057983 | 7/2003 |
| WO | WO 03/093215 | 11/2003 |
| WO | WO 03/104348 | 12/2003 |
| WO | WO 2004/033388 | 4/2004 |
| WO | WO 2004/062763 | 7/2004 |
| WO | WO 2004/083310 | 9/2004 |
| WO | WO 2005/026106 | 3/2005 |
| WO | WO 2005/042655 | 5/2005 |
| WO | WO 2005/080455 | 9/2005 |
| WO | WO 2006/052688 | 5/2006 |
| WO | WO 2006/076364 | 7/2006 |
| WO | WO 2007/002999 | 1/2007 |
| WO | WO 2007/081987 | 7/2007 |
| WO | WO 2007/103398 | 9/2007 |

OTHER PUBLICATIONS

Erhan et al. J. Amer. oil Chem. Soc. vol. 74, 6, 703-706.*
Anderson et al., "Synthesis and Reactivity of Olefin Metathesis Catalysts Bearing Cyclic (Alkyl)(Amino) Carbenes," Angewandte Chemie International Edition, vol. 46, 2007, pp. 7262-7265.
Baumann et al., "Natural Fats and Oils—Renewable Raw Materials for the Chemical Industry," Angewandte Chemie International Edition in English, vol. 27, 1988, pp. 41-62.
Biermann et al., "New Syntheses with Oils and Fats as Renewable Raw Materials for the Chemical Industry,", Angewandte Chemie International Edition, vol. 39, 2000, pp. 2206-2224.
Boelhouwer et al., "Metathesis Reactions of Fatty Acid Esters," Progress of Lipid Research, Pergamon Press, vol. 24, No. 3, 1985, pp. 243-267.
Choi et al., "Olefin Metathesis Involving Ruthenium Enoic Carbene Complexes," Journal of the American Chemical Society, vol. 123, No. 42, 2001, pp. 10417-10418.
Connon et al., "A Solid-Supported Phosphine-Free Ruthenium Alkylidene for Olefin Metathesis in Methanol and Water," Bioorganic & Medical Chem Letters, vol. 12, No. 14, 2002, pp. 1873-1876.
Dunne et al., "A Highly Efficient Olefin Metathesis Initiator: Improved Synthesis and Reactivity Studies," Tetrahedron Letters, vol. 44, No. 13, 2003, pp. 2733-2736.
Erhan et al. , "Drying Properties of Metathesized Soybean Oil," Journal of American Oil Chemists' Society, AOCS Press, vol. 74, No. 6, 1997, pp. 703-706.
Feuge et al., "1,3-Diolein and 1,3-Distearin Esters of Fumaric, Succinic and Adipic Acids," Journal of American Chemical Society, vol. 80, 1958, pp. 6338-6341.
Lavallo, "Stable Cyclic (Alkyl)(Amino) Carbenes as Rigid or Flexible, Bulky, Electron-Rich Ligands for Transition-Metal Catalysts: A Quaternary Carbon Atom Makes the Difference," Angewandte Chemie Int. Ed., vol. 44, 2005, pp. 5705-5709.
Maynard et al., "Purification Technique for the Removal of Ruthenium from Olefin Metathesis Reaction Products," Tetrahedron Letters, vol. 40, No. 22, 1999, pp. 4137-4140.

(56) References Cited

OTHER PUBLICATIONS

Mol, "Applications of Olefin Metathesis in Oleochemistry: An Example of Green Chemistry," Green Chemistry, Royal Society of Chemistry, Cambridge, GB, vol. 4, 2002, pp. 5-13.
Mol et al., "Metathesis in Oleochemistry," J Braz Chem Soc, vol. 9, No. 1, 1998, pp. 1-11.
Mol, "Catalytic Metathesis of Unsaturated Fatty Acid Esters and Oils," Topics in Catalysis, vol. 27, No. 1-4, 2004, pp. 97-104.
Refvik et al., "Ruthenium-Catalyzed Metathesis of Vegetable Oils," Journal of American Oil Chemists' Society, AOCS Press, vol. 76, No. 1, 1999, pp. 93-98.
Schneider et al., "Synthesis of Highly Substituted Cyclopentane and Tetrahydrofuran Derivatives by Crossed Olefin Metathesis," Angewandte Chemi International Edition, vol. 35, No. 4, 1996, pp. 411-412.
Shorland, "Glycol Esters of Dibasic Acids. The Di-β-hydroxyethyl Esters," Journal of American Chemical Society, vol. 57, No. 1, 1935, pp. 115-116.
Tian et al., "Model Studies and the ADMET Polymerization of Soybean Oil," Journal of American Oil Chemists' Society, AOCS Press, vol. 79, No. 5, 2002, pp. 479-488.
Ward et al., "New Fat Products: Glyceride Esters of Adipic Acid," Journal of the Amiercan Oil Chemists' Society, vol. 36, 1959, pp. 667-671.
International Search Report and Written Opinion of the International Searching Authority for International Application No. PCT/US2006/000822, dated Jul. 14, 2006, 13 pages.
International Search Report for International Application No. PCT/US2007/015905, dated Apr. 23, 2008, 3 pages.
International Search Report and Written Opinion of the International Searching Authority for International Application No. PCT/US2007/00610, dated Oct. 11, 2007, 8 pages.
International Search Report and Written Opinion of the International Searching Authority for International Application No. PCT/US2007/005736, dated Aug. 8, 2007, 11 pages.
International Search Report and Written Opinion of the International Searching Authority for International Application No. PCT/US2007/005868, dated Nov. 9, 2007, 7 pages.
International Search Report for International Application No. PCT/US2007/015866, dated Nov. 26, 2007, 3 pages.
International Search Report for International Application No. PCT/US2007/016010, dated Mar. 11, 2008, 4 pages.
International Search Report for International Application No. PCT/US2007/021931, dated Apr. 11, 2008, 3 pages.
International Search Report for International Application No. PCT/US2007/021934, dated Jun. 17, 2008, 3 pages.
International Search Report for International Application No. PCT/US2007/021939, dated Feb. 18, 2008, 2 pages.
International Search Report and Written Opinion of the International Searching Authority for International Application No. PCT/US2008/009604, dated Oct. 27, 2008, 6 pages.
International Search Report and Written Opinion of the International Searching Authority for International Application No. PCT/US2008/009635, dated Oct. 27, 2008, 7 pages.
International Search Report for International Application No. PCT/US2008/065395, dated Sep. 29, 2008, 1 page.
International Search Report for International Application No. PCT/US2008/067025, dated Sep. 8, 2008, 1 page.
Patel et al., "High conversion and productive catalyst turnovers in cross-metathesis reactions of natural oils with 2-butene", Green Chemistry, 2006, vol. 8, pp. 450-454.
Refvik, M.D. et al., "The Chemistry of Metathesized Soybean Oil," JAOCS, vol. 76, No. 1, 1999, pp. 99-102.

\* cited by examiner

Internal Olefins

Internal Olefin

60

62

64

66

68

C823

C827

C627

C712

C697

C682

50 where

L = PCy₃, sIMes, Mes, Phobane
X = H, NO₂, SO₂N(CH₃)₂
X₂ = H, N⁺(C₂H₃)₂CH₃
X₃ = H, Phenyl
R = H, alkyl, aryl, CO₂Me sIMes Mes

52 where

L = PCy₃, sIMes, Mes, Phobane
L' = PCy₃, Phobane

Phobane

COLORANT COMPOSITIONS COMPRISING METATHESIZED UNSATURATED POLYOL ESTERS

CROSS-REFERENCE TO RELATED APPLICATIONS

This application claims the benefit under 35 U.S.C. §371 of International Application No. PCT/US2007/005868, filed Mar. 7, 2007, which claims the benefit of US Provisional Patent Application Serial No. 60/780,127, filed Mar. 7, 2006, which are incorporated herein by reference.

BACKGROUND

"Paintball" is now a recognized and popular sporting activity, played by thousands of men and women throughout this country, as well as in other countries. Paintball involves the use of impact-rupturable capsules that are filled with colorant compositions and are propelled toward the intended target using a paint ball marker. Upon impact, the impact-rupturable capsule breaks open to release the colorant composition onto the target. Release of the colorant composition marks the target with a color that can be chosen to identify a specific individual or team. Various games can be played using paintballs and paintball markers, from simple target practice to individual or team activities where the object is to mark an opponent by striking the opponent with a paintball.

Some currently available colorant compositions used in paintballs are made up of a colorant in a carrier comprising polyethylene glycol (PEG). Among the disadvantages associated with PEG-based colorant compositions include the high cost of PEG, staining of target fabrics, freezing and solidification of the colorant composition during exposure to colder temperatures, separation and precipitation of ingredients during storage, and a thin consistency.

In some instances, formulators have replaced PEG with soybean oil. Compared to PEG, however, soybean oil has a substantially lower specific gravity. For example, the specific gravity of PEG is about 1.1, whereas the specific gravity of soybean oil is about 0.92. Due to its lower specific gravity, the direct substitution of PEG with soybean oil significantly lowers the density of the colorant composition, which may adversely affect the flight characteristics of the paint ball. In order to compensate for the lower density of soybean oil, formulators have added density agents (e.g., salts and other heavier materials) to the colorant formulations to increase their density. Although these materials are effective to increase the density of the resulting compositions, they often separate or settle-out of the carrier and deposit on manufacturing equipment used to prepare the colorant compositions or fill the paint balls. This increases the wear on moving parts (e.g., pumps) and makes change-out or cleaning of other components more frequent.

In view of the foregoing, there exists a need for improved technology relating to impact-rupturable capsules containing colorant compositions. In particular, there is a need to provide new colorant compositions that do not require the use of PEG and that do not include density agents that may settle-out and abrade manufacturing equipment.

SUMMARY

In one aspect the invention provides an improved colorant composition suitable for encapsulation in an impact-rupturable casing that is adapted for intact projectile motion and rupture upon contact with a target surface. Colorant compositions of the invention are useful in paint balls for use in conjunction with projectile devices, for example, paint ball markers.

In one aspect the invention provides a colorant composition for use in impact-rupturable capsules. The colorant composition of the invention comprises:
 (a) a carrier comprising:
  (i) a metathesized unsaturated polyol ester; and
  (ii) a polyol ester; and
 (b) a colorant.

The carrier comprises a metathesized unsaturated polyol ester and a polyol ester. In many embodiments, the metathesized unsaturated polyol ester is hydrogenated (i.e., fully or partially hydrogenated). In some embodiments, the hydrogenated metathesized unsaturated polyol ester is a hydrogenated metathesized vegetable oil. Representative examples include hydrogenated metathesized canola oil, hydrogenated metathesized rapeseed oil, hydrogenated metathesized coconut oil, hydrogenated metathesized corn oil, hydrogenated metathesized cottonseed oil, hydrogenated metathesized olive oil, hydrogenated metathesized palm oil, hydrogenated metathesized peanut oil, hydrogenated metathesized safflower oil, hydrogenated metathesized sesame oil, hydrogenated metathesized soybean oil, and hydrogenated metathesized sunflower oil. Mixtures may also be useful. In some embodiments, the hydrogenated metathesized unsaturated polyol ester comprises one or more of metathesis dimers, trimers, tetramers, pentamers and higher order oligomers.

In some embodiments, the polyol ester comprises a natural oil, such as a vegetable oil, animal fat, or algae oil. Representative examples of vegetable oils include canola oil, rapeseed oil, coconut oil, corn oil, cottonseed oil, olive oil, palm oil, peanut oil, safflower oil, sesame oil, soybean oil, sunflower oil, and the like. Mixtures may also be useful. In an exemplary embodiment, the vegetable oil is refined, bleached, and deodorized (RBD) soybean oil. The vegetable oil may be partially hydrogenated, winterized, or partially hydrogenated and winterized. When partially hydrogenated, the soybean oil may have an iodine value (IV) of about 80 or greater (e.g., about 100 or greater) or from about 100 to about 110.

In some embodiments, the hydrogenated metathesized polyol ester is present in the carrier in an amount of about 10% wt. or less (e.g., about 1% wt. to about 10% wt.). In other embodiments, the hydrogenated metathesized polyol ester is present in the carrier in an amount of about 5% wt. or less. In exemplary embodiments, the carrier comprises about 5% wt. or less hydrogenated metathesized soybean oil and about 95% wt. or greater RBD soybean oil.

The colorant composition further comprises a colorant. The colorant is added to impart a desired color to the colorant composition. Any suitable colorant can be added to impart the desired color to the composition. Suitable colorants include dyes such as FD&C Yellow #5 (from Sensient Technologies Corp).

In some embodiments, the colorant composition comprises about 5% wt. or less colorant and about 95% wt. or greater carrier. In other embodiments, the colorant composition comprises about 1% wt. or less colorant and about 99% wt. or greater carrier.

In some embodiments, the colorant composition further comprises a density agent. In exemplary embodiments, the density agent is a liquid density agent, such as glycerol or polyglycerol. In some embodiments, the colorant composition comprises about 30% wt. or less liquid density agent (e.g., glycerol or polyglycerol). In some embodiments, the colorant composition comprises about 5% wt. to about 30% wt. glycerol or polyglycerol.

In an exemplary embodiment, the colorant composition comprises:
(a) about 5% wt. or less colorant;
(b) about 65 wt % to about 95% wt. of a carrier comprising:
about 1% wt. to about 10% wt. hydrogenated metathesized soybean oil; and
about 90% wt. to about 99% wt. soybean oil; and
(c) about 5% wt. to about 30% wt. liquid density agent selected from the group consisting of glycerol and polyglycerol.

In some embodiments, the colorant composition has a density of about 0.90 gram/cm$^3$ or greater, for example, about 0.95 grams/cm$^3$ or greater, about 1.00 g/cm$^3$ or greater, about 1.05 g/cm$^3$ or greater, or about 1.10 g/cm$^3$ or greater. In exemplary embodiments, the colorant composition has a density of about 0.95 g/cm$^3$ to 1.10 g/cm$^3$.

In another aspect, the invention provides an impact-rupturable capsule comprising a casing adapted to contain a colorant composition. The casing remains intact upon exertion of projectile forces sufficient to propel the casing and ruptures upon impact with a solid or semi-solid surface to release the colorant composition.

In another aspect, the invention provides an impact-rupturable capsule comprising an impact-rupturable casing that is at least partially filled with a colorant composition comprising:
(a) a carrier comprising:
a metathesized polyol ester; and
a polyol ester;
(b) a colorant; and
(c) a density agent.

In some embodiments, the impact-rupturable capsule comprises pigskin gelatin. In some embodiments, the impact-rupturable capsule is spherical in shape.

Advantageously, it has been discovered that the use of hydrogenated and metathesized unsaturated polyol esters in colorant compositions provide a desirable combination of properties useful in impact-rupturable capsules (i.e., paint balls). Specifically, in embodiments of the invention, the colorant composition exhibits reduced separation of components and/or reduced wear on manufacturing equipment. In some embodiments, the colorant compositions provide improved cold temperature performance as compared to colorant compositions based on polyethylene glycol.

BRIEF DESCRIPTION OF THE DRAWINGS

The invention will be described further in connection with the attached drawings, wherein like reference numbers have been used to indicate like parts and wherein.

DETAILED DESCRIPTION

Figure 1:
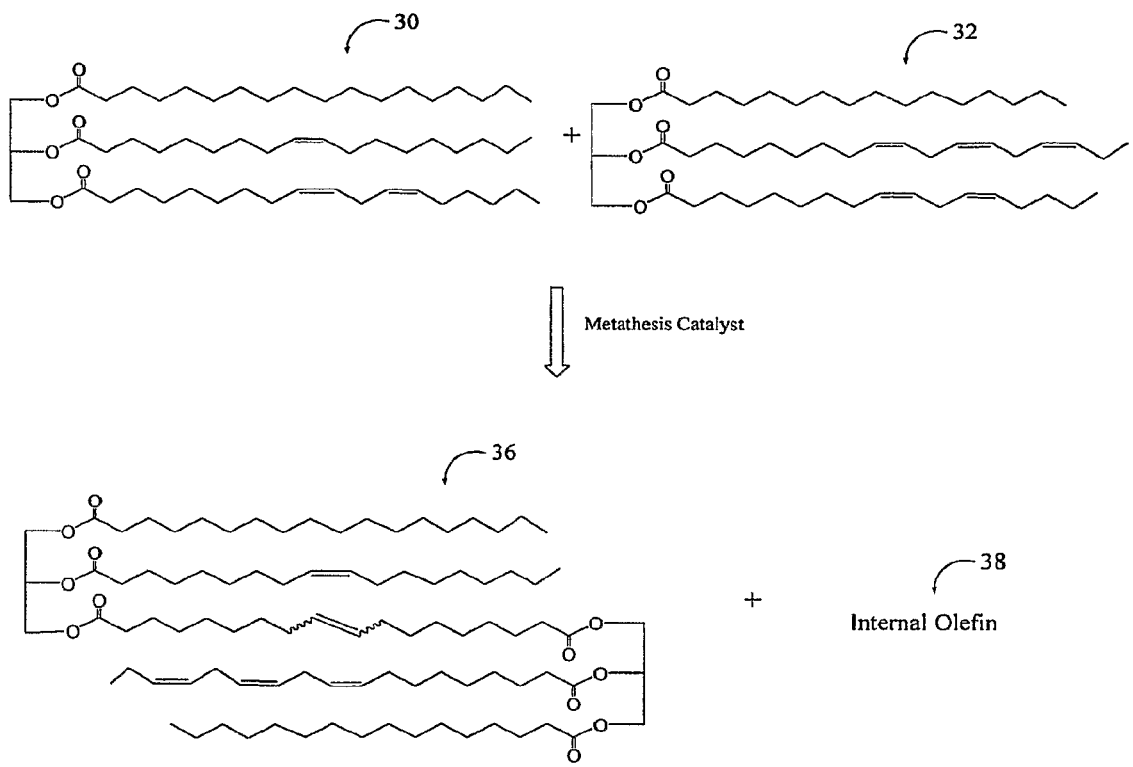
FIG. 1 is an exemplary metathesis reaction scheme.

As used herein, the phrase "casing" is meant to describe a film or sheet material that can be formed into a sealed container defining an interior volume for holding a colorant composition.

As used herein, the term "impact-rupturable capsule" refers to a casing that is at least partially filled with a colorant composition and sealed. The capsule is "impact-rupturable" meaning that the casing of the capsule is adapted to rupture upon impact of the capsule with a target. Impact-rupturable capsules are commonly referred to as "paint balls" and the terms are used synonymously throughout this application.

As used herein the term "paint ball marker" refers to a device for propelling a paint ball in projectile motion towards an intended target.

As used herein the term "target" is meant to refer to the solid or semi-solid object upon which the application of the colorant composition is intended. Such objects can be living, such as human or other animals, or non-living, such as inanimate or moving surfaces and structures. The terms "solid" and "semi-solid" when used in reference to a target surface are meant to describe the physical property of a surface which provides an opposing force sufficient to resist penetration by the impact-rupturable capsule when propelled onto the surface.

The term "liquid" when used to describe the colorant composition of the invention is meant to include any non-solid physical state of the composition capable of dispersing or spreading onto a given surface, i.e., in both its highly flowable state as well as in a semi-solid viscous or gel state.

Colorant compositions of the invention comprise a colorant and a carrier. The carrier comprises a metathesized unsaturated polyol ester and a polyol ester. In many embodiments, the metathesized polyol ester is hydrogenated, for example, fully or partially hydrogenated. The individual components making up the colorant compositions of the invention are described in more detail below.

Metathesized Polyol Ester:

Colorant compositions of the invention comprise a metathesized unsaturated polyol ester. In many embodiments, the metathesized unsaturated polyol ester is hydrogenated. A metathesized unsaturated polyol ester refers to the product obtained when one or more unsaturated polyol ester ingredient(s) are subjected to a metathesis reaction. Metathesis is a catalytic reaction that involves the interchange of alkylidene units among compounds containing one or more double bonds (i.e., olefinic compounds) via the formation and cleavage of the carbon-carbon double bonds. Metathesis may occur between two of the same molecules (often referred to as self-metathesis) and/or it may occur between two different molecules (often referred to as cross-metathesis). Self-metathesis may be represented schematically as shown in Equation I.

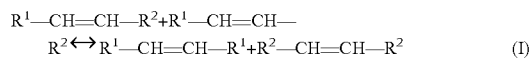

where R$^1$ and R$^2$ are organic groups.

Cross-metathesis may be represented schematically as shown in Equation II.

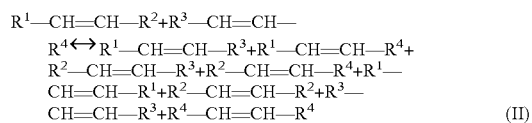

where R$^1$, R$^2$, R$^3$, and R$^4$ are organic groups.

When the unsaturated polyol ester comprises molecules having more than one carbon-carbon double bond (i.e., a polyunsaturated polyol ester), self-metathesis results in oligomerization of the unsaturated polyol ester. The self-metathesis reaction results in the formation of metathesis dimers, metathesis trimers, and metathesis tetramers. Higher order oligomers, such as metathesis pentamers metathesis hexamers may also be formed by continued self-metathesis.

As a starting material, metathesized unsaturated polyol ester(s) are prepared from one or more unsaturated polyol ester ingredients. As used herein, the term "unsaturated polyol ester" refers to a compound having two or more hydroxyl groups wherein at least one of the hydroxyl groups is in the form of an ester and wherein the ester has an organic group including at least one carbon-carbon double bond. In many embodiments, the unsaturated polyol ester can be represented by the general structure (I):

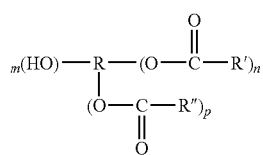

where $n \geq 1$;
$m \geq 0$;
$p \geq 0$;
$(n+m+p) \geq 2$;
R is an organic group;
R' is an organic group having at least one carbon-carbon double bond; and
R" is a saturated organic group.

In many embodiments of the invention, the unsaturated polyol ester is an ester of glycerol. Unsaturated polyol esters of glycerol have the general structure (II):

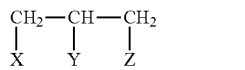

where —X, —Y, and —Z are independently selected from the group consisting of:
—OH; —(O—C(=O)—R'); and —(O—C(=O)—R");
where -R' is an organic group having at least one carbon-carbon double bond and -R" is a saturated organic group.

In structure (II), at least one of —X, —Y, or —Z is —(O—C(=O)—R').

In some embodiments, R' is a straight or branched chain hydrocarbon having about 50 or less carbon atoms (e.g., about 36 or less carbon atoms or about 26 or less carbon atoms) and at least one carbon-carbon double bond in its chain. In some embodiments, R' is a straight or branched chain hydrocarbon having about 6 carbon atoms or greater (e.g., about 10 carbon atoms or greater or about 12 carbon atoms or greater) and at least one carbon-carbon double bond in its chain. In some embodiments, R' may have two or more carbon-carbon double bonds in its chain. In other embodiments, R' may have three or more double bonds in its chain. In exemplary embodiments, R' has 17 carbon atoms and 1 to 3 carbon-carbon double bonds in its chain. Representative examples of R' include:

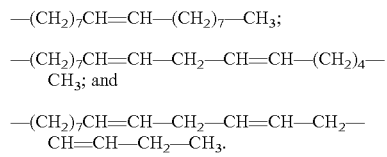

In some embodiments, R" is a saturated straight or branched chain hydrocarbon having about 50 or less carbon atoms (e.g., about 36 or less carbon atoms or about 26 or less carbon atoms). In some embodiments, R" is a saturated straight or branched chain hydrocarbon having about 6 carbon atoms or greater (e.g., about 10 carbon atoms or greater or about 12 carbon atoms or greater. In exemplary embodiments, R" has 15 carbon atoms or 17 carbon atoms.

Sources of unsaturated polyol esters of glycerol include synthesized oils, natural oils (e.g., vegetable oils, algae oil, and animal fats), combinations of these, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, castor oil, combinations of these, and the like. Representative examples of animal fats include lard, tallow, chicken fat, yellow grease, fish oil, combinations of these, and the like. A representative example of a synthesized oil includes tall oil, which is a byproduct of wood pulp manufacture.

In an exemplary embodiment, the vegetable oil is soybean oil, for example, refined, bleached, and deodorized soybean oil (i.e., RBD soybean oil). Soybean oil is an unsaturated polyol ester of glycerol and typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid). Soybean oil is a highly unsaturated vegetable oil with many of the triglyceride molecules having at least two unsaturated fatty acids (i.e., a polyunsaturated triglyceride).

In exemplary embodiments, an unsaturated polyol ester is self-metathesized in the presence of a metathesis catalyst to form a metathesized composition. In many embodiments, the metathesized composition comprises one or more of: metathesis monomers, metathesis dimers, metathesis trimers, metathesis tetramers, metathesis pentamers, and higher order metathesis oligomers (e.g., metathesis hexamers). A metathesis dimer refers to a compound formed when two unsaturated polyol ester molecules are covalently bonded to one another by a self-metathesis reaction. In many embodiments, the molecular weight of the metathesis dimer is greater than the molecular weight of the individual unsaturated polyol ester molecules from which the dimer is formed. A metathesis trimer refers to a compound formed when three unsaturated polyol ester molecules are covalently bonded together by metathesis reactions. In many embodiments, a metathesis trimer is formed by the cross-metathesis of a metathesis dimer with an unsaturated polyol ester. A metathesis tetramer refers to a compound formed when four unsaturated polyol ester molecules are covalently bonded together by metathesis reactions. In many embodiments, a metathesis tetramer is formed by the cross-metathesis of a metathesis trimer with an unsaturated polyol ester. Metathesis tetramers may also be formed, for example, by the cross-metathesis of two metathesis dimers. Higher order metathesis products may also be formed. For example, metathesis pentamers and metathesis hexamers may also be formed.

Figure 1A:
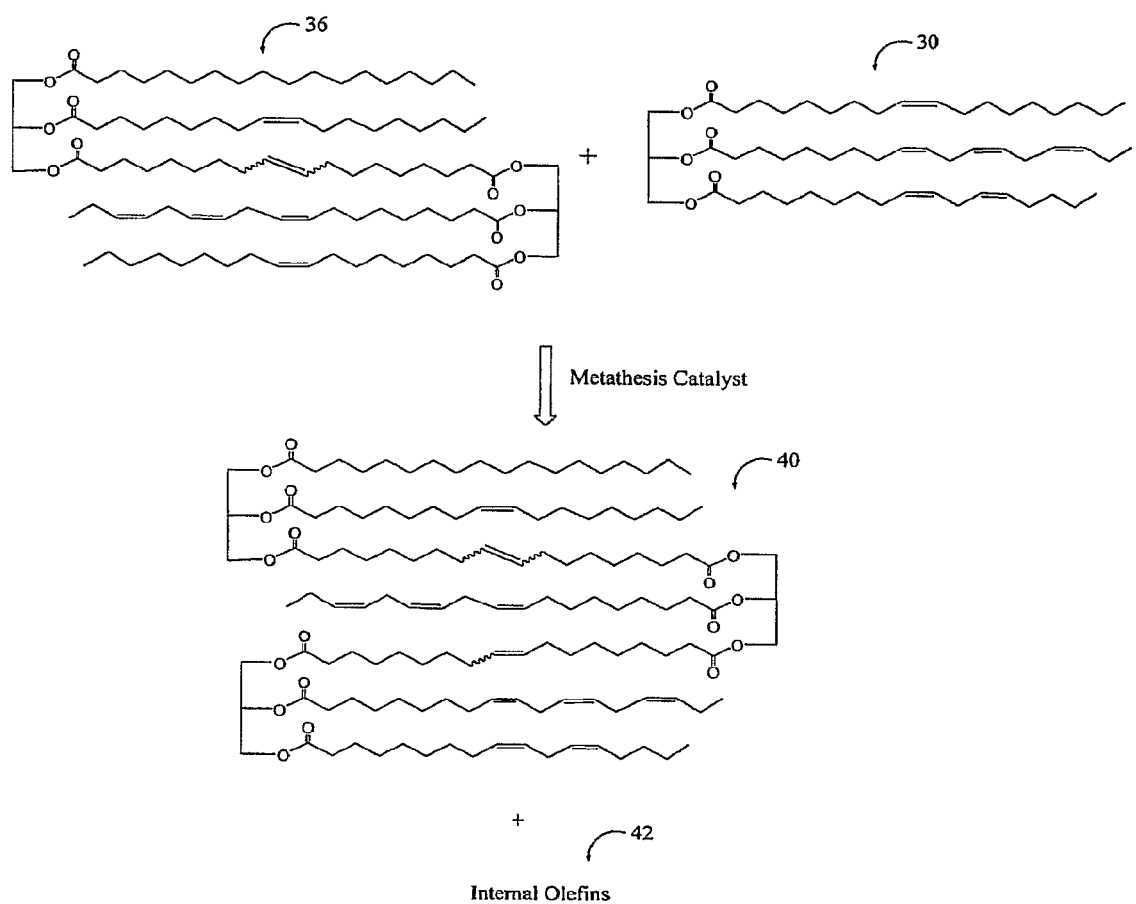
FIG. 1A is an exemplary metathesis reaction scheme.
Figure 1B:
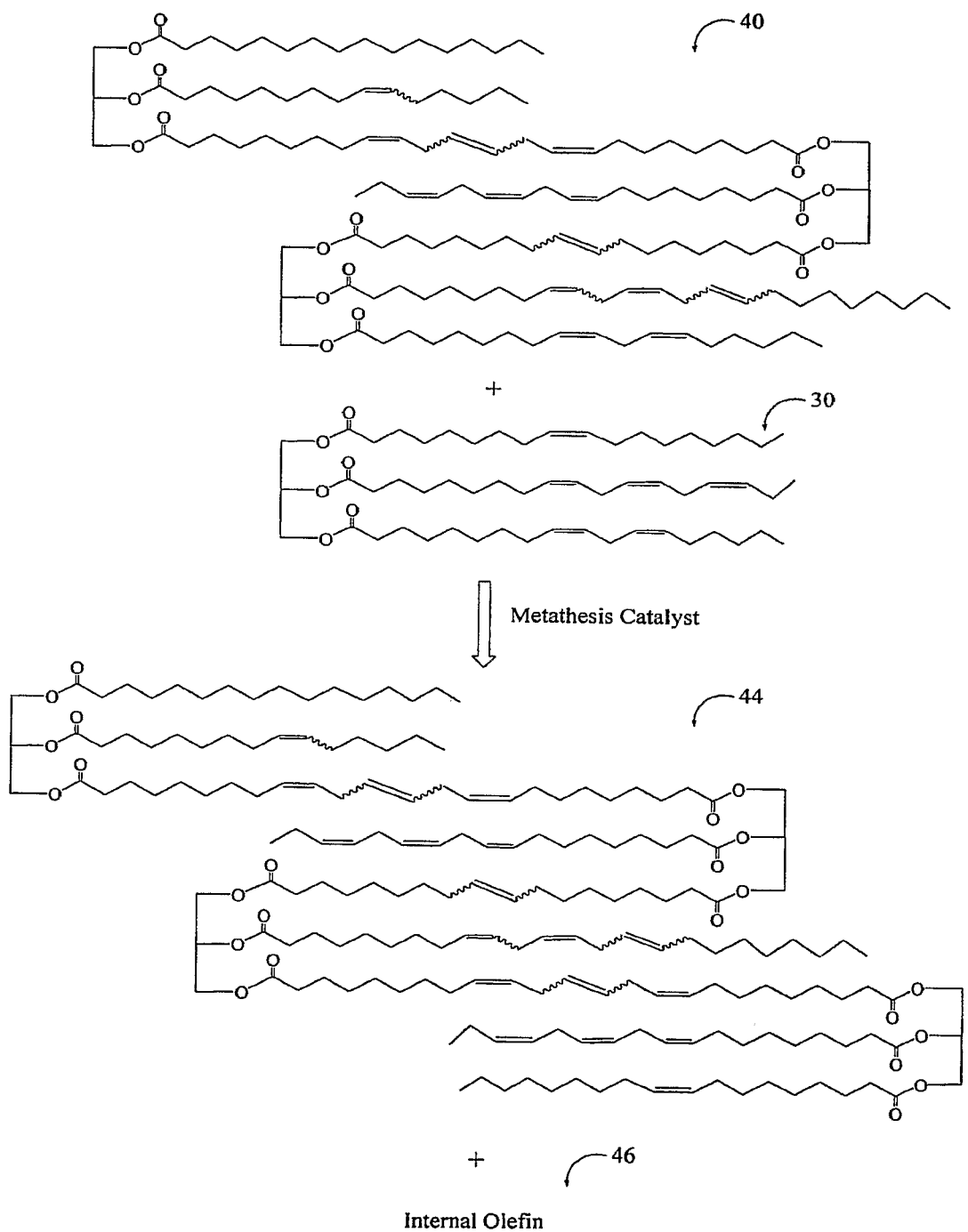
FIG. 1B is an exemplary metathesis reaction scheme.
Figure 1C:
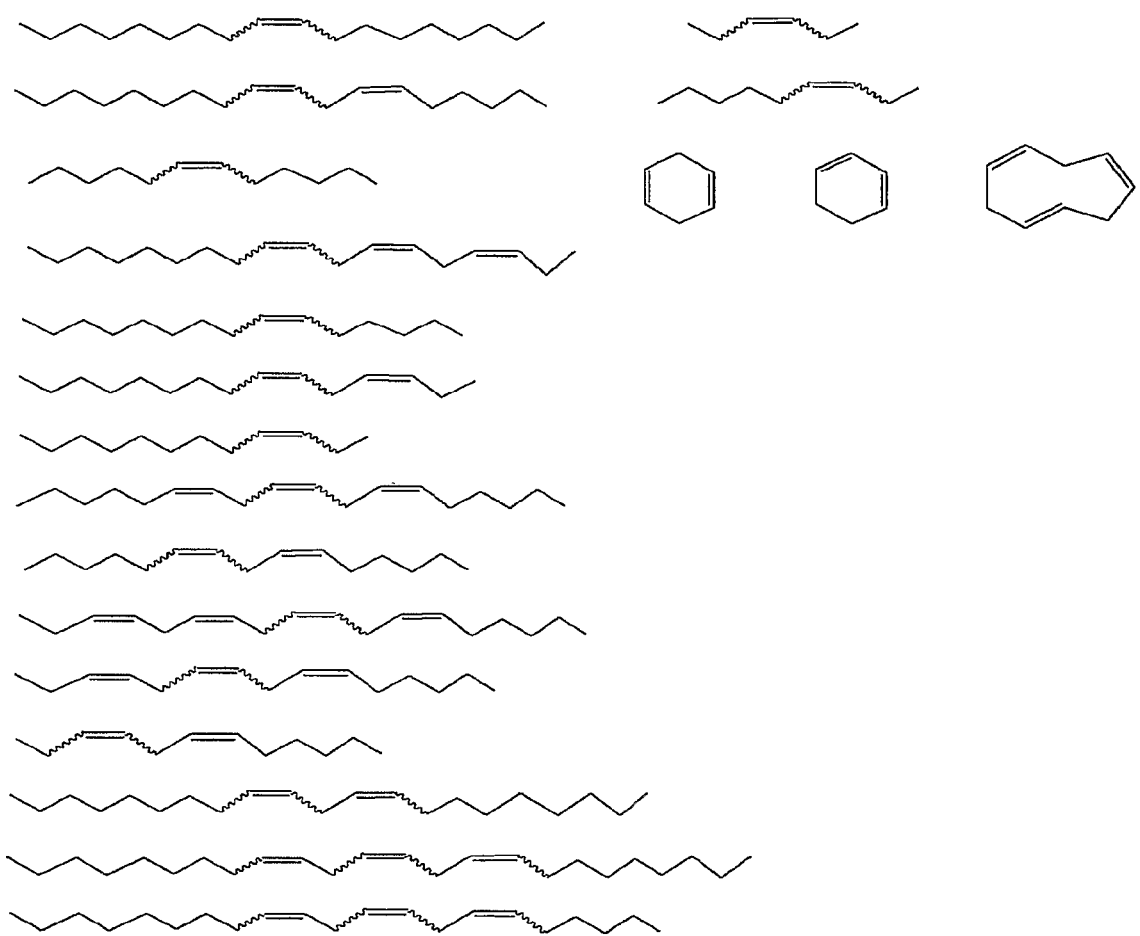
FIG. 1C displays certain internal and cyclic olefins that may be by products of the metathesis reactions of FIGS. 1-1B.

An exemplary metathesis reaction scheme is shown in FIGS. 1-1B. As shown in FIG. 1, triglyceride 30 and triglyceride 32 are self metathesized in the presence of a metathesis catalyst 34 to form metathesis dimer 36 and internal olefin 38. As shown in FIG. 1A, metathesis dimer 36 may further react with another triglyceride molecule 30 to form metathesis trimer 40 and internal olefin 42. As shown in FIG. 1B, metathesis trimer 40 may further react with another triglyceride molecule 30 to form metathesis tetramer 44 and internal olefin 46. In this way, the self-metathesis results in the formation of a distribution of metathesis monomers, metathesis dimers, metathesis trimers, metathesis tetramers, and higher order metathesis oligomers. Also typically present are metathesis monomers, which may comprise unreacted triglyceride, or triglyceride that has reacted in the metathesis reaction but has not formed an oligomer. The self-metathesis reaction also results in the formation of internal olefin compounds that may be linear or cyclic. FIG. 1C shows representative examples of certain linear and cyclic internal olefins 38, 42, 46 that may be formed during a self-metathesis reaction. If the metathesized polyol ester is hydrogenated, the linear and cyclic olefins would typically be converted to the corresponding saturated linear and cyclic hydrocarbons. The linear/cyclic olefins and saturated linear/cyclic hydrocarbons may remain in the metathesized polyol ester or they may be removed or partially removed from the metathesized polyol ester using known stripping techniques. It should be understood that FIG. 1 provides merely exemplary embodiments of metathesis reaction schemes and compositions that may result therefrom The relative amounts of monomers, dimers, trimers, tetramers, pentamers, and higher order oligomers may be determined by chemical analysis of the metathesized polyol ester including, for example, by liquid chromatography, specifically gel permeation chromatography (GPC). For example, the relative amount of monomers, dimers, trimers, tetramers and higher unit oligomers may be characterized, for example, in terms of "area %" or wt. %. That is, an area percentage of a GPC chromatograph can be correlated to weight percentage. In some embodiments, the metathesized unsaturated polyol ester comprises at least about 30 area % or wt. % tetramers and/or other higher unit oligomers or at least about 40 area % or wt. % tetramers and/or other higher unit oligomers. In some embodiments, the metathesized unsaturated polyol ester comprises no more than about 60 area % or wt. % tetramers and/or other higher unit oligomers or no more than about 50 area % or wt. % tetramers and/or other higher unit oligomers. In other embodiments, the metathesized unsaturated polyol ester comprises no more than about 1 area % or wt. % tetramers and/or other higher unit oligomers. In some embodiments, the metathesized unsaturated polyol ester comprises at least about 5 area % or wt. % dimers or at least about 15 area % or wt. % dimers. In some embodiments, the metathesized unsaturated polyol ester comprises no more than about 25 area % or wt. % dimers. In some of these embodiments, the metathesized unsaturated polyol ester comprises no more than about 20 area % or wt. % dimers or no more than about 10 area % or wt. % dimers. In some embodiments, the metathesized unsaturated polyol ester comprises at least 1 area % or wt. % trimers. In some of these embodiments, the metathesized unsaturated polyol ester comprises at least about 10 area % or wt. % trimers. In some embodiments, the metathesized unsaturated polyol ester comprises no more than about 20 area % or wt. % trimers or no more than about 10 area % or wt. % trimers. According to some of these embodiments, the metathesized unsaturated polyol ester comprises no more than 1 area % or wt. % trimers.

In some embodiments, the unsaturated polyol ester is partially hydrogenated before being metathesized. For example, in some embodiments, the soybean oil is partially hydrogenated to achieve an iodine value (IV) of about 120 or less before subjecting the partially hydrogenated soybean oil to metathesis.

In some embodiments, the hydrogenated metathesized polyol ester has an iodine value (IV) of about 100 or less, for example, about 90 or less, about 80 or less, about 70 or less, about 60 or less, about 50 or less, about 40 or less, about 30 or less, about 20 or less, about 10 or less or about 5 or less.

Figure 2:
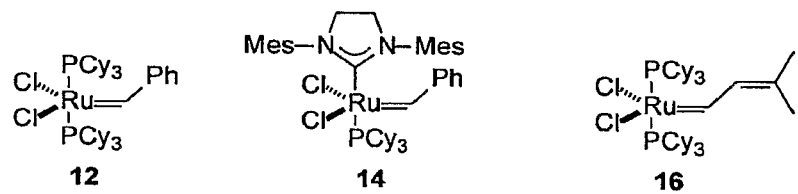
FIG. 2 is a figure showing exemplary ruthenium-based metathesis catalysts.
Figure 3:
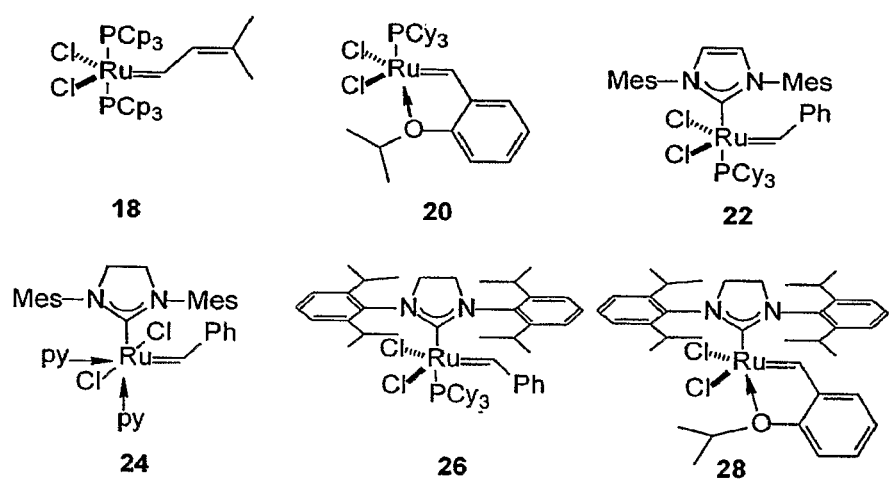
FIG. 3 is a figure showing exemplary ruthenium-based metathesis catalysts.
Figure 4:
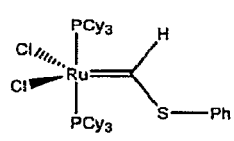
FIG. 4 is a figure showing exemplary ruthenium-based metathesis catalysts.
Figure 4:
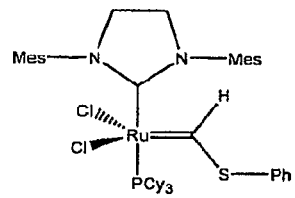
Figure 4:
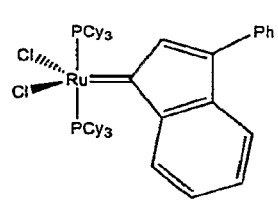
Figure 4:
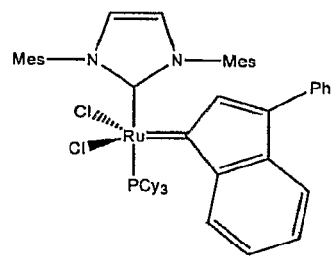
Figure 4:
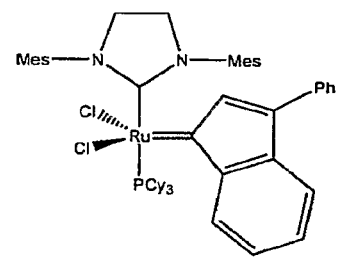
Figure 5:
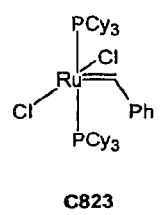
FIG. 5 is a figure showing exemplary ruthenium-based metathesis catalysts.
Figure 5:
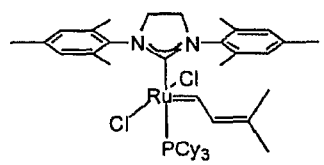
Figure 5:
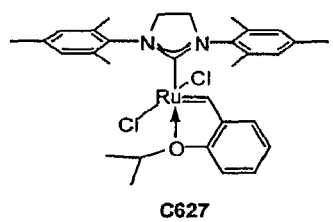
Figure 5:
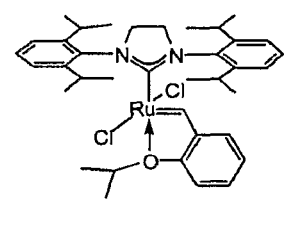
Figure 5:
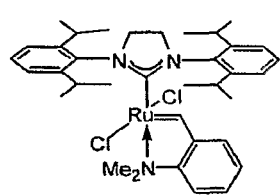
Figure 5:
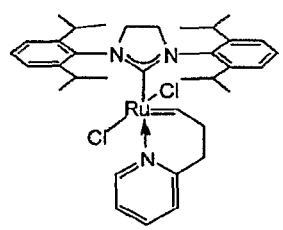
Figure 6:
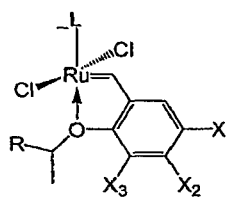
FIG. 6 is a figure showing exemplary ruthenium-based metathesis catalysts.
Figure 6:
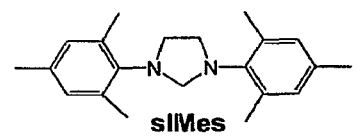
Figure 6:
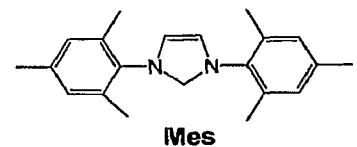
Figure 6:
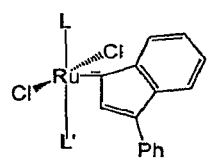
Figure 6:
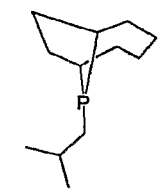

Metathesis Catalysts:

The self-metathesis of unsaturated polyol esters is typically conducted in the presence of a catalytically effective amount of a metathesis catalyst. The term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. Referring to FIG. 2, exemplary ruthenium-based metathesis catalysts include those represented by structures 12 (commonly known as Grubbs's catalyst), 14 and 16. Referring to FIG. 3, structures 18, 20, 22, 24, 26, and 28 represent additional ruthenium-based metathesis catalysts. Referring to FIG. 4, structures 60, 62, 64, 66, and 68 represent additional ruthenium-based metathesis catalysts. Referring to FIG. 5, catalysts C627, C682, C697, C712, and C827 represent still additional ruthenium-based catalysts. Referring to FIG. 6, general structures 50 and 52 represent additional ruthenium-based metathesis catalysts of the type reported in *Chemical & Engineering News*; Feb. 12, 2007, at pages 37-47. In the structures of FIGS. 2-6, Ph is phenyl, Mes is mesityl, py is pyridine, Cp is cyclopentyl, and Cy is cyclohexyl. Techniques for using the metathesis catalysts are known in the art (see, for example, U.S. Pat. Nos. 7,102,047; 6,794,534; 6,696,597; 6,414,097; 6,306,988; 5,922,863; 5,750,815; and metathesis catalysts with ligands in U.S. Patent Publication No. 2007/0004917 A1). Metathesis catalysts as shown, for example, in FIGS. 2-5 are manufactured by Materia, Inc. (Pasadena, Calif.).

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne- or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted tinder an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives may also be present during metathesis that increase catalyst lifetime.

Any useful amount of the selected metathesis catalyst can be used in the process. For example, the molar ratio of the unsaturated polyol ester to catalyst may range from about 5:1 to about 10,000,000:1 or from about 50:1 to 500,000:1. In some embodiments, an amount of about 1 to about 10 ppm, or about 2 ppm to about 5 ppm, of the metathesis catalyst per double bond of the starting composition (i.e., on a mole/mole basis) is used.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 10 kPa, in some embodiments greater than about 30 kP, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

Hydrogenation:

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a metathesized unsaturated polyol ester, and the resulting metathesized unsaturated polyol ester is then partially or fully hydrogenated.

Hydrogenation may be conducted according to any known method for hydrogenating double bond-containing compounds such as vegetable oils. In some embodiments, the unsaturated polyol ester or metathesized unsaturated polyol ester is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

In some embodiments, the hydrogenation catalyst comprising, for example, nickel, copper, palladium, platinum, molybdenum, iron, ruthenium, osmium, rhodium, or iridium. Combinations of metals may also be used. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. In some embodiments, the support comprises porous silica (e.g., kieselguhr, infusorial, diatomaceous, or siliceous earth) or alumina. The catalysts are characterized by a high nickel surface area per gram of nickel.

In some embodiments, the particles of supported nickel catalyst are dispersed in a protective medium comprising hardened triacylglyceride, edible oil, or tallow. In an exemplary embodiment, the supported nickel catalyst is dispersed in the protective medium at a level of about 22 wt. % nickel.

In some embodiments, the supported nickel catalysts are of the type reported in U.S. Pat. No. 3,351,566 (Taylor et al.). These catalysts comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 wt. % to 50 wt. % nickel and a total silica content of 30 wt. % to 90 wt %. The particles are activated by calcining in air at 600° F. to 900° F. (315.5° C. to 482.2° C.), then reducing with hydrogen.

Useful catalysts having a high nickel content are described in EP 0 168 091, wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66% by weight.

Useful high activity nickel/alumina/silica catalysts are described in EP 0 167 201. The reduced catalysts have a high nickel surface area per gram of total nickel in the catalyst.

Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties. U.S. Pat. No. 4,490,480 reports high surface area nickel/alumina hydrogenation catalysts having a total nickel content of 5% to 40% wt.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

The amount of hydrogenation catalysts is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 wt. % or less, for example, about 5 wt. % or less or about 1 wt. % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 wt. % or less, for example, about 5 wt. % or less or about 1 wt. % or less. Other filtering techniques and filtering aids may also be employed to remove the used hydrogenation catalyst. In other embodiments the hydrogenation catalyst is removed using centrifugation followed by decantation of the product.

Polyol Esters:

The carrier comprises one or more polyol esters. Representative examples of polyol esters include natural oils, for example, vegetable oils, algae oils, or animal fats. Examples of natural oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, castor oil, and the like, and mixtures thereof. Examples of animal fats include lard, tallow, chicken fat (yellow grease), fish oil, and mixtures thereof. Preferred natural oils are liquids at room temperature and are stable over time. In an exemplary embodiment, the natural oil is refined, bleached, and deodorized soybean oil (i.e., RBD soybean oil). Suitable RBD soybean oil can be obtained commercially from Cargill, Incorporated. (Minneapolis, Minn.).

In some embodiments, the natural oil may be partially or fully hydrogenated in order to improve the stability of the natural oil or to modify its viscosity or other properties. Representative techniques for hydrogenating natural oils are known in the art. For example, hydrogenation of certain vegetable oils is reported in Chapter 11 of Bailey, A. E.; *Baileys Industrial Oil and Fat Products; Volume* 2: *Edible Oil & Fat Products: Oils and Oil Seeds;* 5$^{th}$ Edition (1996) edited by Y. H. Hui (ISBN 0471-59426-1). In some embodiments, the natural oil is RBD soybean oil that has been lightly hydrogenated to achieve an Iodine Value (IV) of about 80 or greater (e.g., about 100 or greater). In some embodiments, the lightly hydrogenated soybean oil has an IV of about 100 to about 110. Suitable lightly hydrogenated RBD soybean oil is commercially available from Cargill, Incorporated (Minneapolis, Minn.).

In some embodiments, the polyol ester may comprise a mixture of natural oils. For example, in some embodiments, the polyol ester may comprise a mixture of fully-hydrogenated soybean oil (e.g., having an IV of about 5 or less) and non-hydrogenated soybean oil.

In some embodiments, the natural oil is winterized. Winterization refers to the process of: (1) removing waxes and other non-triglyceride constituents, (2) removing naturally occurring high-melting triglycerides; and (3) removing high-melting triglycerides formed during partial hydrogenation. Winterization may be accomplished by known methods including, for example, cooling the oil at a controlled rate in order to cause crystallization of the higher melting components that are to be removed from the oil. The crystallized high melting components are then removed from the oil by filtration resulting in winterized oil. Suitable winterized soybean oil is commercially available from Cargill, Incorporated (Minneapolis, Minn.).

Useful carrier compositions are also reported, for example, in U.S. Provisional Application Ser. No. 60/780,125 (filed Mar. 7, 2006) entitled "COMPOSITIONS COMPRISING METATHESIZED UNSATURATED POLYOL ESTERS"; and in PCT Application entitled "COMPOSITIONS COMPRISING METATHESIZED UNSATURATED POLYOL ESTERS"; Attorney Docket Number CAR0020WO (filed Mar. 7, 2007).

Density Agent:

In some embodiments, the colorant compositions of the invention comprise a liquid density agent. One example of a useful density agent is glycerol (i.e., HO—$CH_2$—CHOH—$CH_2$—OH; CAS 56-81-5; also commonly called glycerine or 1,2,3, propanetriol). In liquid form, glycerol has a density of about 1.3 grams/$cm^3$ and can be added to the colorant composition to raise its density. Advantageously, glycerol increases the density of the colorant composition without adding solid materials to the formulation. Solid density agents (e.g., calcium carbonate, tricalcium phosphate, dicalcium phosphate, zinc gluconate, zinc sulfate, zinc oxide, and zinc citrate) are less desirable because they may settle-out of the composition and clog or damage the manufacturing equipment that is used to prepare the colorant composition and fill the impact-rupturable capsules. Suitable glycerol may be purified glycerol (e.g., USP or CP grade) or may be crude glycerol (e.g., about 88% wt. glycerol with the balance comprising salts and color bodies).

Other liquid density agents include, for example, polyglycerols. Representative polyglycerols have the general formula:

where n is 2 or greater.

Polyglycerol may include, for example, diglycerol (n=2), triglycerol (n=3), tetraglycerol (n=4), pentaglycerol (n=5), hexaglycerol (n=6), and higher order polyglycerol oligomers (n>6). Typically, polyglycerol is a mixture of various oligomeric species. Polyglycerol typically has a density of about 1.2 g/$cm^3$ to about 1.3 g/$cm^3$. Diglycerol and polyglycerol are commercially available from Solvay Chemicals, Inc. (Houston, Tex.).

In some embodiments, the density agent is present in the colorant composition in an amount sufficient to provide the paint ball with the desired flight characteristics and to assist in the rupture of the paint ball upon impact with a target surface. If the density agent is present in an amount that is too low, the density may not be sufficient to provide the paint ball with the desired flight characteristics and rupture properties. If the density agent is present in an amount that is too high, the density agent may interfere with other desirable properties of the colorant composition, for example, the density agent may interfere with the proper sealing of the impact-rupturable capsules.

When used as the density agent, glycerol is typically present in an amount of about 30% wt. or less of the colorant composition, more typically in an amount of about 5% wt. to about 30% wt. of the colorant composition. In an exemplary embodiment, glycerol is present in an amount of about 15% wt. to about 20% wt. of the colorant composition.

In some embodiments, the colorant composition has a density of about 0.90 gram/$cm^3$ or greater, for example, about 0.95 grams/$cm^3$ or greater, about 1.00 g/$cm^3$ or greater, about 1.05 g/$cm^3$ or greater, or about 1.10 g/$cm^3$ or greater. In exemplary embodiments, the colorant composition has a density of about 0.95 g/$cm^3$ to 1.10 g/$cm^3$.

Colorant:

Colorant compositions of the invention comprise one or more colorants that impart a desired color to the composition. In some embodiments, the colorant is a dye. Representative examples of dyes include those commercially available from Sensient Technologies, Corp. (e.g., FD&C Yellow #5). The colorant may be any desired color or combination of colors, for example, red, magenta, pink, yellow, blue, orange, purple, violet, green, and the like. Typically, highly visible colors are used, including fluorescent versions of the colors.

The colorant can be present in an amount sufficient to afford the composition with the desired level or depth of color. Typically, the colorant is present in an amount of up to about 5% wt. of the total colorant composition. In exemplary embodiments, the colorant is present in an amount of up to about 1% wt. of the total colorant composition.

Stabilizers:

In some embodiments, the colorant composition further includes one or more stabilizers. Representative stabilizers include antioxidants (e.g., tocopherols or BHT) or emulsifiers. Typically, stabilizers are added in an amount less than about 2% wt. to the colorant composition although other amounts may be useful.

Method of Manufacturing Colorant Composition:

The colorant composition of the invention may be prepared by the following general process. First, the polyol ester (e.g., soybean oil) is heated to a temperature of about 100° F. to 150° F. (37.8° C. to 65.6° C.). Next, the hydrogenated metathesized unsaturated polyol ester (e.g., hydrogenated metathesized soybean oil) is added to the polyol ester and the two materials are mixed to form a uniform composition. After mixing, the resulting carrier containing the polyol ester and hydrogenated metathesized unsaturated polyol ester is cooled, for example, to a temperature below about 100° F. (37.8° C.). Upon cooling, the resulting composition forms a viscous liquid or gel. Next, the density agent, if present in the composition, is added to the carrier and is mixed-in until uniform. Following this, the colorant is added and is mixed-in until uniform. The resulting colorant composition can then be used to fill impact-rupturable casings to form impact-rupturable capsules as described below.

Casing Material:

The casing material used in the impact-rupturable capsule of the invention may be any conventional material which can be formed into a capsule and adapted to encapsulate liquid contents while permitting rupture of the casing upon exertion of physical force thereon.

Preferably, the casing material has chemical properties compatible with the composition contained thereby and physical properties sufficient to resist exertion of a projectile force while insufficient to resist impact forces following high airborne velocities. Representative examples of casing materials include those that can be formed into an elastic ribbons or sheets to be filled with liquid and are suitable for heat or solvent sealing consistent with conventional die roll encapsulation manufacturing techniques. Additional suitable casing materials include, but are not limited to, gelatin (e.g., pigskin gelatin), PVC, celluloses, modified starches, carrageenans, gums, pectins, alginates, and the like. Those skilled in the encapsulation arts will readily be able to select the appropriate casing material based upon the composition of the fill and the equipment used to perform the encapsulation. An example of a useful casing material is one consisting primarily if pigskin gelatin.

The overall shape of the capsule and casing may vary. Preferably, the shape of the capsule permits substantially linear movement through air when fired by a paint ball marker. Typically, the shape of the capsule is spherical. The diameter of the capsule may vary but is preferably compatible with the paint ball marker with which it is to be used. For example, a 0.68 caliber spherical capsule can be used with many commercially available paint ball markers.

Preparation of Impact-Rupturable Capsules:

Impact-rupturable capsules of the invention may be prepared using conventional techniques and apparatuses. Generally, with some modifications, the apparatuses used to prepare soft gelatin capsules (e.g., in the pharmaceutical field) may be used to manufacture impact-rupturable capsules. One example of a suitable apparatus is described U.S. Pat. No. 5,735,105 (Shroud et al.). This patent reports an apparatus and method for preparing liquid-filled capsules using a die roll apparatus and a casing material in the form of a ribbon or sheet.

The impact-rupturable capsules of the invention may be set into projectile motion with a paint ball marker device with the casing substantially intact at a velocity sufficient to create a rupturing of the casing and release of the colorant composition upon physical impact with a target surface. Typically, the projectile velocity ranges from about 200 ft/sec to about 400 ft/sec, more typically about 200 ft/sec. to about 300 ft/sec. Examples of suitable paint ball markers include those commercially available from Pursuit Marketing, Inc. (PMI) (Schiller Park, Ill.).

In use, an impact-rupturable capsule is removed from a container and loaded into the paint ball marker. The marker is aimed at the intended target and fired, ejecting the impact-rupturable capsule substantially intact at high speed toward the target through the use of pressurized carbon dioxide or nitrogen gas. Upon impact on the target surface, the casing ruptures thereby releasing the colorant composition onto the surface. The appearance of the colorant composition on the target is readily apparent by the observer.

The invention will now be described with reference to the following non-limiting examples.

EXAMPLES

Materials List

RBD SBO—refined, bleached, and deodorized soybean oil (from Cargill, Incorporated)
GLOL—USP glycerol (from Cargill, Incorporated)
HSBO(100)—partially hydrogenated SBO having an IV of 100 (from Cargill, Incorporated)
HSBO(110)—partially hydrogenated SBO having an IV of 110 (from Cargill, Incorporated)
HSBO(5)—fully hydrogenated soybean oil having an IV of 5 or less (from Cargill, Incorporated)
CAT—hydrogenation catalyst ("PRICAT 9925" from Johnson Matthey)
DE—diatomaceous earth filter aid ("CELATOM FW-14" from EaglePicher Filtration, Reno, Nev.).

Preparation of Hydrogenated Metathesized Soybean Oil (HMSBO):

15,900 pounds of RBD SBO was loaded into a reaction vessel. The soybean oil was agitated and was sparged with $N_2$ gas for 2.5 hours at a rate of 50 SCFH. Separately, 361 grams (50 ppm of catalyst in the final reaction mixture) of C827 metathesis catalyst was slurried in about 3 gallons of RBD SBO. The resulting slurry was added to the soybean oil in the reaction vessel. Following addition of the catalyst, the head space in the vessel was evacuated and purged with $N_2$ gas a total of 3 times over a period of 1 hour. During this time, the reaction mixture was heated to 71° C. The reaction mixture was then held in the reaction vessel for a period of about 3 hours during which the temperature rose to 76° C. GC analysis of samples of the reaction mixture showed that the reaction mixture reached equilibrium about 30 minutes after addition of the inetathesis catalyst.

Next, 35.0 pounds (15.9 kg) of CAT was charged to the vessel. Following addition of the catalyst, the head space in the vessel was evacuated and purged with $N_2$ gas a total of 3 times over a period of 1 hour. During this time, the reaction mixture was heated to 130° C. When the temperature reached 130° C., $H_2$ gas was charged to the vessel. Thirty minutes into hydrogenation the reaction mixture reached a temperature of 180° C. and the flow of hydrogen was stopped for a period of about 75 minutes. After this, the $H_2$ charging resumed for an additional 3 hours during which the temperature ranged between 172° C. and 194° C. The resulting hydrogenated metathesized soybean oil was cooled to a temperature of 84° C. and excess $H_2$ was vented off. The oil was held at about 5 to 8 psig for about 9.5 hours before filtering.

The resulting product was filtered by recirculating the product through a plate and frame filter (Sparkler, Conroe, Tex.) with a pre-coat of about 25 pounds of DE. The product was recirculated through the filter for about 13 hours total. Twice during the filtration, the filter was taken apart for cleaning and was conditioned with about 25 pounds of filter aid. During filtration, the product was at a temperature of about 90° C. or less.

Preparation of Colorant Compositions:

Examples 1-6 were prepared according to the following general procedure. First, RBD SBO (Examples 1-3 and 7) or RBD HSBO (Examples 5-6) was heated to a temperature of about 135° F. (57.2° C.). Next, the HMSBO was added to the heated RBD SBO or RBD HSBO and the resulting composition was stirred for a period of about 20 minutes until thoroughly mixed. After mixing, the resulting composition was allowed to cool to about 70° F. to 90° F. (21.1° C. to 32.2° C.). After cooling, GLOL was added to the composition and was mixed in until uniform. Following this, the colorant (less than 1% wt. on carrier of FD&C Yellow #5 Alum Lake from Sensient Technologies Corp.) was added to the composition and was mixed in until uniform. The amount of each material used is listed in TABLE 1. Density of the resulting colorant compositions was measured in accordance with AOCS CC 10c-95. The results are reported in TABLE 1.

TABLE 1

| Ingredient | Ex. 1 | Ex. 2 | Ex. 3 | Ex. 4 | Ex. 5 | Ex. 6 | Ex. 7 |
|---|---|---|---|---|---|---|---|
| RBD SBO | 80.7 | 76.0 | 66.5 | 79.7 | 0 | 0 | 95.0 |
| HMSBO | 4.3 | 4.0 | 3.5 | 4.3 | 4.3 | 4.3 | 5.0 |
| GLOL | 15.0 | 20.0 | 30.0 | 15.0 | 15.0 | 15.0 | 0 |
| HSBO(5) | 0 | 0 | 0 | 1.0 | 0 | 0 | 0 |
| HSBO(100) | 0 | 0 | 0 | 0 | 80.7 | 0 | 0 |
| HSBO(110) | 0 | 0 | 0 | 0 | 0 | 80.7 | 0 |
| Density (g/cm$^3$) | 0.99 | 1.03 | 1.10 | 0.99 | 0.99 | 0.99 | 0.92 |

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein.

Various omissions, modifications, and changes to the principles and embodiments described herein may be made by one skilled in the art without departing from the true scope and spirit of the invention which is indicated by the following claims.

What is claimed is:

1. A colorant composition for use in an impact-rupturable capsule comprising a uniform mixture of:
   (a) a carrier comprising:
      (i) a hydrogenated metathesized unsaturated polyol ester, wherein the hydrogenated metathesized unsaturated polyol ester comprises a hydrogenated metathesized vegetable oil selected from the group consisting of hydrogenated metathesized canola oil, hydrogenated metathesized rapeseed oil, hydrogenated metathesized corn oil, hydrogenated metathesized cottonseed oil, hydrogenated metathesized olive oil, hydrogenated metathesized peanut oil, hydrogenated metathesized safflower oil, hydrogenated metathesized sesame oil, hydrogenated metathesized soybean oil, and hydrogenated metathesized sunflower oil;
      (ii) a polyol ester;
   (b) a colorant; and
   (c) a density agent consisting essentially of a liquid density agent;
   wherein the colorant composition has a density has a density of about 0.95 grams/cm$^3$ to about 1.15 grams/cm$^3$.

2. The colorant composition of claim 1, wherein the polyol ester comprises a natural oil.

3. The colorant composition of claim 2, wherein the natural oil is a vegetable oil.

4. The colorant composition of claim 3, wherein the vegetable oil is soybean oil.

5. The colorant composition of claim 4, wherein at least a portion of the soybean oil is at least partially hydrogenated.

6. The colorant composition of claim 5, wherein the partially hydrogenated soybean oil has an iodine value of about 80 or greater.

7. The colorant composition of claim 1, wherein the liquid density agent is selected from the group consisting of glycerol and polyglycerol.

8. The colorant composition of claim 7, wherein the glycerol is selected from the group consisting of crude glycerol and refined glycerol.

9. The colorant composition of claim 1, wherein the hydrogenated metathesized unsaturated polyol ester comprises one or more of metathesis dimers, metathesis trimers, metathesis tetramers, metathesis pentamers and higher order oligomers.

10. The colorant composition of claim 1, wherein the carrier comprises about 10% wt. or less hydrogenated metathesized unsaturated polyol ester.

11. The colorant composition of claim 1, wherein the carrier comprises about 1% wt. to about 10% wt. hydrogenated metathesized soybean oil.

12. A colorant composition for use in an impact-rupturable capsule comprising a uniform mixture of:
   (a) a colorant;
   (b) a carrier comprising:
      hydrogenated metathesized soybean oil; and
      soybean oil; and
   (c) a liquid density agent selected from the group consisting of glycerol and polyglycerol.

13. The colorant composition of claim 12 comprising:
   (a) about 5% wt. or less colorant;
   (b) about 65 wt % to about 95% wt. of a carrier comprising:
      about 1% wt. to about 10% wt. hydrogenated metathesized soybean oil; and
      about 90% wt. to about 99% wt. soybean oil; and
   c) about 5% wt. to about 30% wt. liquid density agent selected from the group consisting of glycerol and polyglycerol.

14. An impact-rupturable capsule comprising:
   an impact-rupturable casing having an interior cavity;
   a colorant composition comprising a uniform mixture of:
      (a) a colorant;
      (b) a carrier comprising:
         a hydrogenated metathesized polyol ester, wherein the hydrogenated metathesized unsaturated polyol ester comprises a hydrogenated metathesized vegetable oil selected from the group consisting of hydrogenated metathesized canola oil, hydrogenated metathesized rapeseed oil, hydrogenated metathesized corn oil, hydrogenated metathesized cottonseed oil, hydrogenated metathesized olive oil, hydrogenated metathesized peanut oil, hydrogenated metathesized safflower oil, hydrogenated metathesized sesame oil, hydrogenated metathesized soybean oil, and hydrogenated metathesized sunflower oil;
         a polyol ester; and
      (c) a density agent consisting essentially of a liquid density agent;
   wherein the interior cavity is at least partially filled with the colorant composition.

15. The impact-rupturable capsule of claim 14, wherein the polyol ester comprises a natural oil.

16. The impact-rupturable capsule of claim 15, wherein the natural oil is a vegetable oil.

17. The impact-rupturable capsule of claim 16, wherein the vegetable oil is soybean oil.

18. The impact-rupturable capsule of claim 17, wherein at least a portion of the soybean oil is at least partially hydrogenated.

19. The impact-rupturable capsule of claim 18, wherein the partially hydrogenated soybean oil has an iodine value of about 80 or greater.

20. The impact-rupturable capsule of claim 14, wherein the liquid density agent is a liquid and is selected from the group consisting of glycerol and polyglycerol.

21. The impact-rupturable capsule of claim 20, wherein the glycerol is selected from the group consisting of crude glycerol and refined glycerol.

22. The impact-rupturable capsule of claim 14, wherein the carrier comprises about 10% wt. or less hydrogenated metathesized unsaturated polyol ester.

23. An impact-rupturable capsule comprising:
   an impact-rupturable casing having an interior cavity;
   a colorant composition comprising a uniform mixture of:
      (a) a colorant;
      (b) a carrier comprising:
         a metathesized polyol ester; and
         a polyol ester;
      (c) a density agent consisting essentially of a liquid density agent;
   wherein the interior cavity is at least partially filled with the colorant composition, and wherein the carrier comprises about 1% wt. to about 10% wt. hydrogenated metathesized soybean oil.

24. An impact-rupturable capsule comprising:
an impact-rupturable casing having an interior cavity;
a colorant composition comprising a uniform mixture of comprises:
(a) about 5% wt. or less colorant;
(b) about 65wt% to about 95% wt. of a carrier comprising:
   about 1% wt. to about 10% wt. hydrogenated metathesized soybean oil; and
   about 90% wt. to about 99% wt. soybean oil; and
(c) about 5% wt. to about 30% wt. liquid density agent selected from the group consisting of glycerol and polyglycerol, wherein the interior cavity is at least partially filled with the colorant composition.

\* \* \* \* \*